Patented Aug. 11, 1936

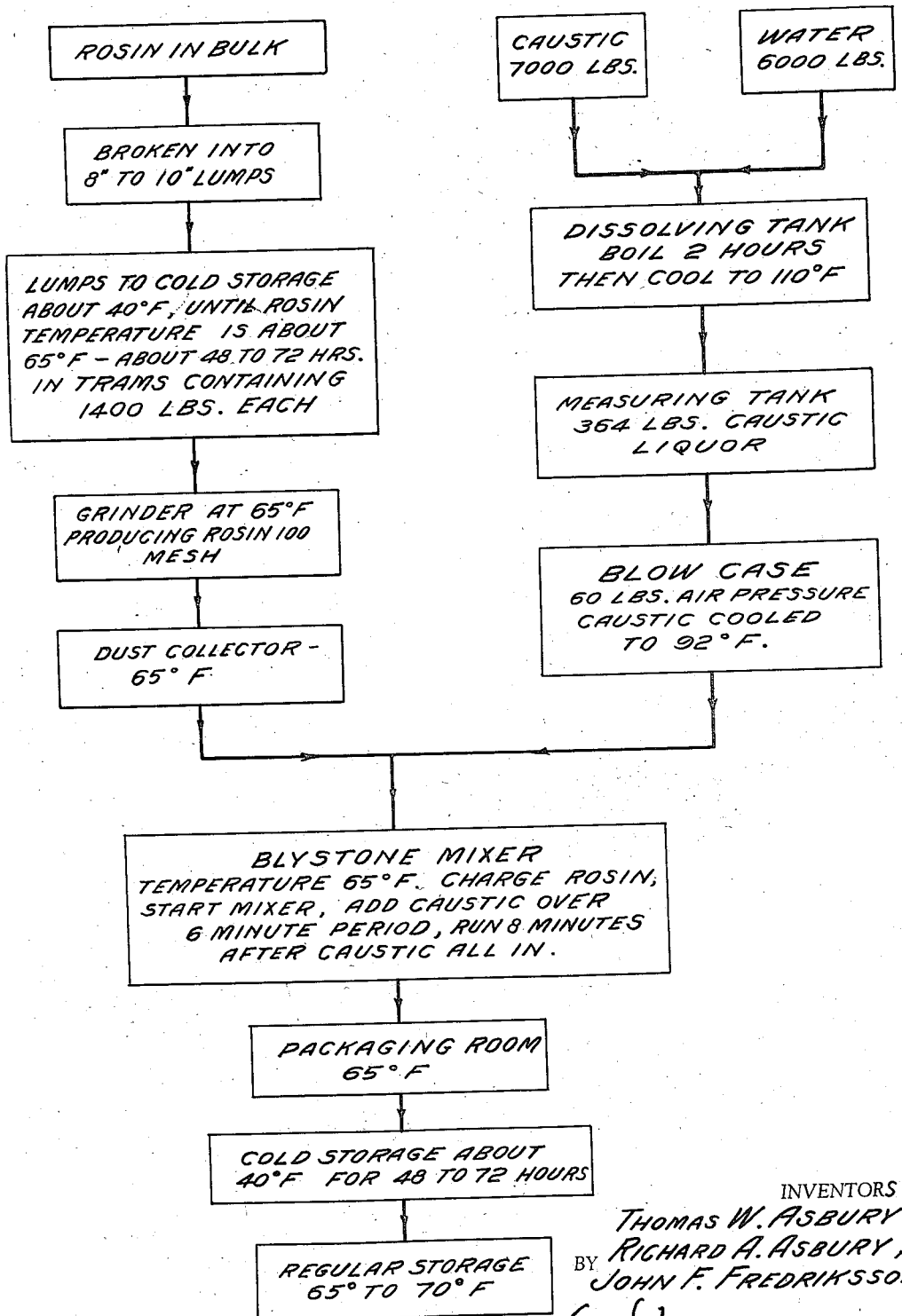

2,050,997

UNITED STATES PATENT OFFICE 2,050,997

METHOD OF MAKING A DRY ROSIN SIZE COMPOSITION

Thomas W. Asbury, Valdosta, Ga., Richard A. Asbury, Joliet, Ill., and John F. Fredriksson, Baldwin, N. Y., assignors to American Cyanamid and Chemical Corporation, New York, N. Y., a corporation of Delaware Application August 2, 1934, Serial No. 738,028

7 Claims. (Cl. 134—21)

The present invention relates to methods of making a dry rosin sizing composition.

The principal object of the invention is to provide a rosin sizing composition initially in a dry state, that is, without going through the steps of making a liquid sizing solution or emulsion followed by subsequent dehydration or desiccation.

Reference is here made to the co-pending application of John F. Fredriksson, Serial #571,990, filed October 29, 1931. The present invention constitutes an improvement upon the teachings there set forth and includes the details of operation which have been found to be desirable as a result of experimentation over a long period of years.

The above entitled patent application discloses a method of making a direct dry rosin sizing composition by admixing together powdered rosin and a solution of caustic soda or potash with agitation, there being insufficient water in the mix to produce a liquid product. There is also disclosed as a modification the admixing of rosin and either caustic soda or potash with water as a third addition, to produce the same result, there being insufficient water in the mix to produce a liquid product. As a result of these operations, a direct dry product results which, it is believed contains unreacted rosin, unreacted caustic and some alkali metal rosinate. In this state the product may be readily shipped in cheap, light, substantially waterproof containers such as paper bags without undue caking, with minimum fire hazard and the customer may readily form a size solution or emulsion by placing this composition in the requisite amount of water with agitation. Those portions of the unreacted ingredients in the composition react in the mixing operation with water to produce the desired liquid size.

The size composition as above prepared has the advantages of ease of manufacture, minimum freight payment due to the lack of necessity of heavy shipping containers and material absence of moisture and ease of storge and conversion into the liquid product by the customer. These and other advantages are set forth in the co-pending Fredriksson application.

In the course of operations over a considerable period of time, certain details of manufacture have been arrived at which are believed to be important from the standpoint of efficient operation and maintenance of a uniform product, which details constitute the present invention and are indicated herein.

To this end, the invention contemplates the details of operation set forth in the accompanying flow sheet and more specifically described hereinafter.

Referring now with particularity to the flow sheet, a convenient and efficient method of operating to produce the desired product may consist of taking the rosin of any desired type, depending upon the quality of product to be produced therefrom, from its original containers and breaking the material into lumps, say not over 2 inches in diameter. This lump rosin is then loaded into trams or other conveyors and sent to cold storage maintained at approximately 40° F. until the rosin temperature is substantially 70° F. or below. A temperature of 65° F. has been found to be a suitable one. This storage usually requires from 48 to 72 hours.

A charge of 1,400 lbs. of rosin at the above temperature is then passed to a grinding machine of any desired type, provided with a dust collector to prevent loss of fine material, and the rosin ground to pass a 100 mesh screen. By maintaining the rosin below 70° F. grinding is greatly facilitated. From the grinding apparatus, the powdered material passes to a mixing device of which a Blystone mixer is typical, while the room within which the mixing operation takes place is preferably maintained at 65° F., or below 70° F.

The alkali with which the rosin is to be reacted preferably consists of caustic soda, although caustic potash is considered as the equivalent. A storage tank is charged with 7,000 lbs. of 76% flake caustic soda and substantially 6,000 lbs. of water, the caustic dissolved and boiled for a period of say two hours. This heat treatment has been shown to materially improve the product. It is believed that at this stage any carbonates occurring in the caustic are eliminated. The solution of caustic at from 52° to 52.5° Bé. (tester at 120° F.) is then cooled to 110° F. with a water coil after the boiling period. This partially cooled solution then passes to a measuring tank.

The quantity of caustic liquor used for each batch of rosin will, of course, vary depending upon the degree of saponification desired in the dry product and the final liquid product made by the consumer. In order to produce a size which will yield an emulsion in which substantially all the rosin is saponified, substantially 14% of the rosin as caustic should be used. Therefore, for each 1,400 lbs. batch of powdered rosin in the Blystone, we prefer to use 364 lbs. of caustic liquor made as above. This amount contains 196 lbs. of caustic, which is 14% of the rosin batch. Where the customer desires a size containing free rosin, a proportionately less amount of the caustic liquor should, of course, be used.

A blow case is provided where the solution is cooled to approximately 92° F. or in any event to a temperature where its fluidity will be maintained. The solution is then transferred from the blow case to the mixer which contains the powdered rosin, as for instance by air pressure at 60 lbs. gauge. It is desirable to run the agitator in the mixer during the caustic addition and to add the caustic gradually, say over a period of six minutes.

It is important that no undue rise in temperature should be permitted to occur during the mixing operation and a maintained temperature of 65° F. has been found to give optimum results. The mixer may be run for substantially 8 minutes after the caustic addition has been made.

At the end of this period, the dry product is passed to the packaging room preferably maintained at 65° F. and placed in the ultimate containers which may be substantially waterproof paper bags or the like. After packaging, the packages are placed in cold storage at substantially 40° F. or in any event less than 50° F. preferably and in a substantially dry atmosphere, for a period of from 48 to 72 hours. This chilling of the product is believed to completely arrest any progressing reaction in the composition and has been found to be of material advantage. The chilling period will need to be extended beyond the 72 hours where a larger proportion of caustic is used than in the above example. Where the composition is packaged in substantially moistureproof containers during this chilling period, the atmosphere of the package is of course substantially dry. Where the composition is not packaged at this point, it is preferabe of course to reduce the humidity of the atmosphere to a point where the reaction will remain suspended.

After the chilling period, the packages may be passed to the regular storage maintained preferably between 65° and 70° F. although a slightly higher temperature is not unduly detrimental.

By following the above procedure, a good grade product is obtained, which will maintain its quality during storage and shipment and which may be used by the customer with the requisite amount of water to produce a liquid sizing composition of the desired type.

It is to be understood, of course, that there occurs in the Blystone a partial reaction between the caustic and the rosin but that due to the fact that the quantity of water is insufficient to produce a liquid product, this reaction does not go to completion at that point. Storage of the dry material at comparatively low temperatures and in the absence of substantial quantities of moisture serves to completely arrest this reaction. Microscopic examination of the particles at this point indicate that they consist of particles of rosin, particles of caustic and particles containing both caustic and rosin coated with a film of alkali metal resinate, and this coating serves to prevent further reaction between the ingredients, due to absorption of moisture. In this state, the dry, granular product may be readily stored for long periods of time in substantially moistureproof containers without caking and without the reaction progressing further. When the customer takes this material and adds it to the requisite amount of water with complete agitation, the resinate coating first dissolves, then the caustic, which free caustic acts upon the unreacted rosin with complete saponification to produce the desired emulsion.

While the invention has been described with particularity and by reference to specific embodiments, obviously these details are by way of example of optimum conditions and the invention is to be construed broadly and limited only by the scope of the claims.

We claim:
1. A method of making a dry rosin sizing composition which includes the steps of grinding lump rosin below 70° F. and adding thereto a solution of alkali hydroxide while agitating the batch and maintaining the temperature thereof at substantially 65° F., the quantity of water used being insufficient to produce a liquid product in which the caustic is first boiled and then cooled while maintaining the fluidity of the solution.

2. A method of making a dry rosin sizing composition which includes the steps of grinding lump rosin below 70° F. and adding thereto a solution of alkali hydroxide while agitating the batch and maintaining the temperature thereof at substantially 65° F., the quantity of water used being insufficient to produce a liquid product in which the caustic solution is greater than 50%, is boiled and then cooled before adding to the rosin.

3. A method of making a dry rosin sizing composition which includes the steps of grinding lump rosin below 70° F. and adding thereto a solution of alkali hydroxide while agitating the batch and maintaining the temperature thereof at substantially 65° F., the quantity of water used being insufficient to produce a liquid product in which the finished product is chilled in a substantially dry atmosphere until any progressing reaction in the composition has been arrested.

4. A method of making a dry rosin sizing composition which includes the steps of grinding lump rosin below 70° F. and adding thereto a solution of alkali hydroxide while agitating the batch and maintaining the temperature thereof at substantially 65° F., the quantity of water used being insufficient to produce a liquid product in which the finished product is chilled below 50° F. for an appreciable length of time.

5. A method of making a dry rosin sizing composition which includes the steps of grinding lump rosin below 70° F. and adding thereto a solution of alkali hydroxide while agitating the batch and maintaining the temperature thereof at substantially 65° F., the quantity of water used being insufficient to produce a liquid product in which the finished product is chilled to 40° F.

6. A method of making a dry rosin sizing composition which includes the steps of grinding lump rosin below 70° F. and adding thereto a solution of alkali hydroxide while agitating the batch and maintaining the temperature thereof at substantially 65° F., the quantity of water used being insufficient to produce a liquid product in which the finished product is packaged and then stored at substantially 40° F. for from 48–72 hours.

7. A method of making a dry rosin sizing composition which includes the steps of chilling lump rosin, grinding the same while chilled, making a greater than 50% solution of caustic soda, boiling the same for an appreciable length of time, chilling the solution to remove the heat of solution while maintaining its fluidity, contacting the rosin and the caustic soda solution during agitation while maintaining the temperature of the mix at substantially 65° F., the amount of water used being insufficient to produce a liquid product, and then chilling the product in a substantially dry atmosphere to arrest any progressing reaction.

THOMAS W. ASBURY.
RICHARD A. ASBURY.
JOHN F. FREDRIKSSON.